United States Patent
Nguyen et al.

(10) Patent No.: US 9,957,440 B2
(45) Date of Patent: May 1, 2018

(54) EXPANDABLE PARTICULATES AND METHODS OF USE AND PREPARATION

(71) Applicant: Halliburton Energy Services, Inc., Houston, TX (US)

(72) Inventors: Philip D. Nguyen, Houston, TX (US); James William Ogle, Spring, TX (US); Ali Alwattari, Humble, TX (US); Loan Kim Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 14/915,080

(22) PCT Filed: Sep. 27, 2013

(86) PCT No.: PCT/US2013/062192
§ 371 (c)(1),
(2) Date: Feb. 26, 2016

(87) PCT Pub. No.: WO2015/047301
PCT Pub. Date: Apr. 2, 2015

(65) Prior Publication Data
US 2016/0208161 A1 Jul. 21, 2016

(51) Int. Cl.
*C09K 8/80* (2006.01)
*E21B 43/26* (2006.01)
(Continued)

(52) U.S. Cl.
CPC ............ *C09K 8/805* (2013.01); *C04B 20/123* (2013.01); *C04B 26/10* (2013.01); *C09K 8/03* (2013.01);
(Continued)

(58) Field of Classification Search
CPC . C09K 2208/12; C09K 2208/04; C09K 8/805
(Continued)

(56) References Cited

U.S. PATENT DOCUMENTS

| 4,277,582 A | 7/1981 | Mueller et al. |
| 5,597,784 A | 1/1997 | Sinclair et al. |

(Continued)

FOREIGN PATENT DOCUMENTS

| EP | 0098908 | 1/1984 |
| EP | 0114875 | 8/1984 |

(Continued)

OTHER PUBLICATIONS

International Search Report and Written Opinion for International Application No. PCT/US2013/062192 dated Jun. 26, 2014.

*Primary Examiner* — William D Hutton, Jr.
*Assistant Examiner* — Ashish K Varma
(74) *Attorney, Agent, or Firm* — Craig W. Roddy; Tumey L.L.P.

(57) ABSTRACT

Embodiments relate to preparation of expandable particulates and their use in fracturing operations. An embodiment provides a method for treating a subterranean formation comprising: introducing a treatment fluid comprising expandable particulates into the subterranean formation, wherein the expandable particulates each comprise a particulate substrate, a swellable material coating the particulate substrate, and an exterior coating comprising a resin; and depositing at least a portion of the expandable particulates in the subterranean formation.

13 Claims, 3 Drawing Sheets

(51) Int. Cl.
    *C09K 8/03*     (2006.01)
    *C09K 8/56*     (2006.01)
    *C04B 20/12*     (2006.01)
    *C04B 26/10*     (2006.01)
    *C09K 8/44*     (2006.01)
    *C09K 8/62*     (2006.01)
    *E21B 43/267*     (2006.01)

(52) U.S. Cl.
    CPC ................ *C09K 8/44* (2013.01); *C09K 8/56* (2013.01); *C09K 8/62* (2013.01); *E21B 43/26* (2013.01); *E21B 43/267* (2013.01); *C09K 2208/04* (2013.01); *Y02W 30/96* (2015.05); *Y02W 30/97* (2015.05)

(58) Field of Classification Search
    USPC ..................................................... 166/280.2
    See application file for complete search history.

(56) References Cited

U.S. PATENT DOCUMENTS

| | | | |
|---|---|---|---|
| 7,490,667 B2 | 2/2009 | Sinclair et al. | |
| 7,931,084 B2 | 4/2011 | Nguyen et al. | |
| 8,236,903 B2 | 8/2012 | Schaffer et al. | |
| 2007/0036977 A1 | 2/2007 | Sinclair et al. | |
| 2008/0108524 A1 | 5/2008 | Willberg et al. | |
| 2008/0261834 A1 | 10/2008 | Simon | |
| 2009/0176667 A1 | 7/2009 | Nguyen et al. | |
| 2010/0089581 A1* | 4/2010 | Nguyen ................ | C09K 8/685 166/280.2 |
| 2010/0193191 A1 | 8/2010 | Roddy | |
| 2010/0260941 A1* | 10/2010 | Bushmire ................ | C08J 7/123 427/515 |
| 2011/0244695 A1 | 10/2011 | Gvishi | |
| 2012/0172518 A1* | 7/2012 | Roddy ................... | C04B 28/02 524/575 |

FOREIGN PATENT DOCUMENTS

| | | |
|---|---|---|
| EP | 1239955 | 9/2002 |
| EP | 1661925 | 5/2006 |
| EP | 1676005 | 7/2006 |
| WO | 8400551 | 2/1984 |
| WO | 01045839 | 6/2001 |
| WO | 2005035880 | 4/2005 |
| WO | 2010129120 | 11/2010 |

* cited by examiner

EXPANDABLE PARTICULATES AND METHODS OF USE AND PREPARATION

BACKGROUND

Embodiments relate to expandable particulates for use in subterranean applications and, in certain embodiments, to preparation of expandable particulates and their use in fracturing operations.

After a well bore is drilled, it may be necessary to fracture the subterranean formation to enhance hydrocarbon production. This may be particularly important in shale formations that typically have high-closure stresses. Access to the subterranean formation, in some instances, can be achieved by first creating an access conduit (e.g., perforation) from the well bore to the subterranean formation. Then, a fracturing fluid, called a pad, may be introduced at pressures exceeding those required to maintain matrix flow in the formation permeability to create or enhance at least one fracture that propagates from the well bore. The pad fluid may be followed by a fluid comprising a proppant in the form of a solid particulate to prop the fracture or fractures open after the pressure is reduced. In some formations (e.g., shale formations), the primary fracture can further branch into other fractures, smaller fractures, and microfractures; all extending through either a direct branch or indirect branch from the primary fracture and creating a complex fracture network. As used herein, a "complex fracture network" refers to a field or network of interconnecting fractures, which may include a primary fracture, secondary branch fractures, tertiary branch fractures, quaternary branch fractures, and the like. The complex fracture network encompasses the primary fracture and any and all branching fractures, regardless of size, man-made or otherwise, within a subterranean formation, that are in fluid communication with the access conduit and/or well bore. The proppant should hold the complex fracture network open, thereby allowing gas to flow through the complex fracture network to ultimately be produced at the surface.

The proppant may be selected based on its ability to maintain the fractures in a propped condition. This proppant characteristic may be based on the proppant size and crush strength, for example. The proppant may typically be an appropriate size to prop open the fractures while also allowing fluid to flow in between and around the proppant in the fractures. A variety of different materials have been used as proppant including silica (e.g., sand), walnut shells, sintered bauxite, glass, plastics, and ceramic materials, among others. While these materials have been used in fracturing operations, drawbacks have been encountered, especially in unconventional formations such as shale formations, where very small proppant has been used. For example, the very small proppant may have a tendency to settle to the bottom of the fracture and thus limit the size of the fracture after the pressure is reduced. Additionally, the smaller proppant may not have adequate strength to resist deformation/crushing upon application of the closure stress when the pressure is reduced.

In addition to proppant, swellable materials have also been deposited into one or more fractures as part of a fracturing treatment. Swellable materials may typically be capable of swelling upon contact with a swell-activating agent, such as water or a hydrocarbon fluid. While swellable materials have been included in fracturing treatments, because most materials that swell are typically soft, they may compress and expand outwardly into the fracture face upon release of pressure and effectively block/fill pore spaces. This may cause an undesired decrease in formation permeability. Thus, successful incorporation of swellable materials into fracturing treatments has been challenging.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Embodiments relate to expandable particulates for use in subterranean applications and, in certain embodiments, to preparation of expandable particulates and their use in fracturing operations. In accordance with certain embodiments, an expandable particulate may be provided that comprises a particulate substrate, a swellable material coating the particulate substrate, and an exterior coating that comprises a resin. As used herein, the term "coating" is not intended to imply any degree of coating of the coating material onto the substrate onto which it is applied. Rather, the disclosed embodiments are intended to encompass a coating material that fully or partially covers the substrate onto which it is applied.

In a fracturing operation, the expandable particulate may be carried downhole and deposited in one or more fractures. In some embodiments, the expandable particulate may be sized for placement into a micro-fracture in a complex fracture network. As used herein, the term "micro-fracture" refers to a fracture or any portion of a fracture having at least one cross-sectional dimension (e.g., width, height) of less than or equal to 100 microns, thus limiting the size of particulates that can enter the micro-fracture. The expandable particulate together with additional optional proppant may prop the fractures in an open condition while also allowing fluid flow through the fracture. By including an exterior coating of resin, the performance of the swellable material may be enhanced. By way of example, once swelled and expanded, the embedment of the swellable material into the fracture face may be minimized as the integrity of the expandable particulate may be maintained, potentially resulting in enhanced permeability and conductivity of the propped fractured. In addition, use of the expandable particulate may enhance the bridging effect of proppant in the fractures. By way of example, It should be understand that the proppant in the fractures may include the expandable particulates as well as additional proppant that may optionally be deposited in the fractures with the expandable particulates. Thus, the vertical particulate distribution in the fractures may be increased in some embodiments. Additionally, the formation of multiple particulate-free arch channels (e.g., formed on top of the settled proppant packs) may be increased, in further embodiments, to greatly enhance well production.

Figure 1:
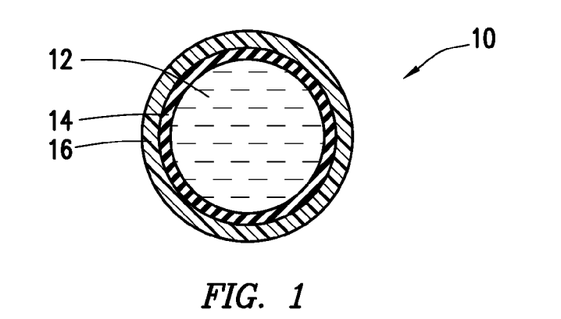
FIG. 1 illustrates a cross-sectional view of an example expandable particulate produced in accordance with embodiments in an unexpanded configuration.

FIG. 1 illustrates an expandable particulate 10 produced in accordance with certain embodiments in an unexpanded configuration. As illustrated, the expandable particulate 10 may comprise a particulate substrate 12 that has been coated with a swellable material 14. In the illustrated embodiment, the performance of the swellable material 14 has been enhanced by coating the swellable material with a resin to form an exterior coating 16.

Figure 2:
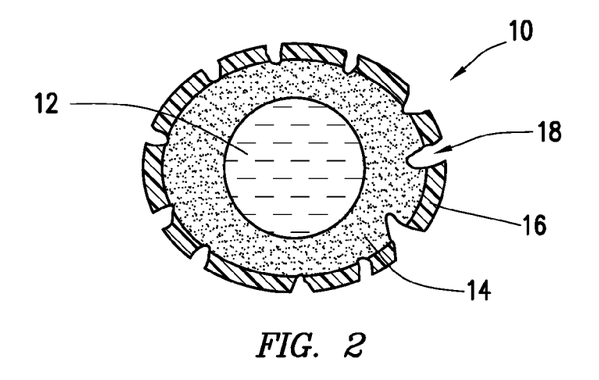
FIG. 2 illustrates a cross-sectional view of an example expandable particulate produced in accordance with embodiments in an expanded configuration.

After the swellable material 14 has come into contact with a swell-activating agent, such as water or a hydrocarbon fluid, the swellable material 14 may swell causing expansion of the expandable particulate 10, as illustrated by FIG. 2. For example, the expandable particulate 10 may expand by about 50% or more of its initial volume. In some embodiments, the expandable particulate 10 may expand in a range of from about 50% to about 2,000% and, more particularly, from about 200% to about 1,000% of its initial volume. As further illustrated by FIG. 2, the expandable particulate 10 may further include one or more access paths 18 through the exterior coating 16. In particular embodiments, the access paths 18 provide for communication with the swellable material 14 so that the swell-activating agent may penetrate the exterior coating 16 and come into contact with the swellable material 14. The access paths 18 may be formed in the exterior coating 16 by a number of suitable techniques, including dissolution of portions of the exterior coating 16, application of pressure to crack/break the exterior coating 16 (which may be applied during particulate preparation or applied by closure stress after placement in the fractures), or by application of only a partial coating of the resin onto the swellable material 14.

Figure 3:
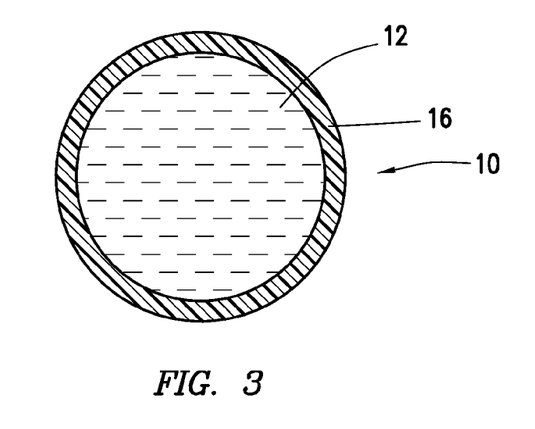
FIG. 3 illustrates a cross-sectional view of another example expandable particulate produced in accordance with embodiments in an unexpanded configuration.

FIG. 3 illustrates another example of an expandable particulate 10 produced in accordance with alternative embodiments in an unexpanded configuration. As illustrated, the expandable particulate 10 may comprise a particulate substrate 12. In contrast to the embodiment of FIG. 1, in which the expandable particulate 10 further comprised a swellable material 14 coating the particulate substrate 10 and an exterior coating 16 of a resin on the swellable material 14, the embodiment of FIG. 3 includes an exterior coating 16 that comprises a resin and a swellable material. By way of example, a resin may be mixed with a swellable material and then coated onto the particulate substrate 10 to form the exterior coating 16.

Embodiments of the expandable particulate may include a particulate substrate. A wide variety of particulate substrates may be used in accordance with present embodiments. Examples of suitable particulate substrates include, without limitation, sand, bauxite, ceramic materials, glass materials, polymer materials, TEFLON® (tetrafluoroethylene) materials, nut shells, ground or crushed nut shells, seed shells, ground or crushed seed shells, fruit pit pieces, ground or crushed fruit pits, processed wood, composite particulates (including those composite particulates prepared from a binder with filler particulate including silica, alumina, fumed carbon, carbon black, graphite, mica, titanium dioxide, meta-silicate, calcium silicate, kaolin, talc, zirconia, boron, fly ash, hollow glass microspheres, and solid glass), or mixtures thereof. Because the exterior coating of the resin may be used to enhance the strength of the expandable particulates, a lower quality particulate substrate in some embodiments may be used than would typically be used as a proppant, thus providing cost savings over the use of a traditional proppant.

The particulate substrate may be an appropriate size to prop open the fractures and allow fluid to flow around the expandable particulates. In some embodiments, the particulate substrate may be prepared from small sized particulates, for example, particulates that are less than 100 mesh. Particle sizes greater than 100 mesh are typically considered conventional proppant sizes. Conventional proppant may be placed in the primary or main fractures. It is desired, in some embodiments, for the particulate substrate to have a small particle size for placement into microfractures in a complex fracture network. In some embodiments, the particulate substrate may have a d50 of less than about 150 microns and, alternatively have a d50 in a range of from about 1 micron to about 150 microns. One of ordinary skill in the art, with the benefit of this disclosure, should be able to select a suitable particulate substrate for use in preparation of the expandable particulates.

Embodiments of the expandable particulate may include a swellable material. As previously described, the swellable material may be coated onto the particulate substrate. In some embodiments, the swellable material may be mixed with the resin and then that mixture may be used to form an exterior coating on the particulate substrate. It is believed a large proportion of gas flow in fractures in unconventional formations occurs not where the proppant has accumulated at choke points but rather in between these spaces where there may be little proppant. By inclusion of an expandable material more void space may be created between these choke points by expansion of the expandable material over time. In addition, the swellable material may enhance the bridging effect of the proppant in the fracture. Without being limited by theory, proppant grains may be selected for limited sizes so they can be placed into the fracture without causing premature screen out. Because the expandable particulate expands in the fracture, the proppant grains may be allowed to lock in the width of the fracture. This locking effect may cause bridging of the other non-swellable proppant grains and prevent them from settling to the lower side of the fracture.

In some embodiments, the amount of the swellable material coated on the particulate substrate may be in the range of about 0.1% to about 10% by weight of the particulate substrate and, alternatively, about 3% to about 6% by weight of the particulate substrate. The particulate substrate may be coated with a swellable material by any suitable method as recognized by one skilled in the art with the benefit of this disclosure. By way of example, the swellable material may be coated on the particulate substrate by batch mixing, partial batch mixing, or on-the-fly coating. In some embodiments, the swellable material may be coated onto the particulate substrate on-the-fly at the well site by injecting or spraying the swellable material to one end of an auger device or sand screw containing the particulate substrate. The rotation or auger action of the auger device helps spread the swellable material to coat the particulate substrate. The term "on-the-fly" is used herein to mean that a flowing stream is continuously introduced into another flowing stream so that the streams are combined and mixed while continuing to flow as a single stream.

Any appropriate swellable material may be used in preparation of the expandable particulates. In some embodiments, the swellable material may be capable of swelling to at least 200% of the volume of the swellable material prior to swelling. In further embodiments, the swellable material may be capable of swelling to at least 400% of the volume of the swellable material prior to swelling. The swellable material should be capable of swelling upon contact with a swell-activating agent. The swell-activating agent can be any agent that causes the swellable material to swell via absorption of the swell-activating agent. In some embodiments, the swellable material may be "water swellable," meaning that the swell-activating agent is water. In another embodiment, the swellable material may be "oil swellable," meaning that the swell-activating agent is a hydrocarbon fluid. Examples of hydrocarbon fluids include, but are not limited to, diesel, kerosene, crude oil, and any combination thereof in any proportion. In some embodiments, the swellable material may only swell upon application of some external trigger, such as heat, pH, light, or chemical additives. In other words, the swellable material will not substantially absorb the swell-activating agent without application of the external trigger.

Examples of suitable water-swellable materials include, but are not limited to: cross-linked polyacrylamide; cross-linked polyacrylate; cross-linked polymers of acrylamide and acrylate monomers; starch grafted with acrylonitrile and acrylate; cross-linked polymers of two or more of allylsulfonate, 2-acrylamido-2-methyl-1-propanesulfonic acid, 3-allyloxy-2-hydroxy-1-propanesulfonic acid, acrylamide, acrylic acid monomers, or any combination thereof in any proportion; salts of carboxyl starch; salts of carboxylmethyl starch; salts of carboxymethyl cellulose; salts of cross-linked carboxyalkyl polysaccharide; starch grafted with acrylonitrile and acrylate monomers; and any combination thereof.

Examples of suitable oil-swellable materials include, but are not limited to: a natural rubber; an acrylate-butadiene rubber; a polyacrylate rubber; an isoprene rubber; a chloroprene rubber; a butyl rubber; a brominated butyl rubber; a chlorinated butyl rubber; a neoprene rubber; a styrene-butadiene copolymer rubber; a sulphonated polyethylene rubber; an ethylene-acrylate rubber; an epichlorohydrin ethylene oxide copolymer rubber; an ethylene-propylene rubber; an ethylene-propylene-diene terpolymer rubber; an ethylene vinyl acetate copolymer rubber; a fluoro rubber; a fluoro silicone rubber; a silicone rubber; a poly 2,2,1-bicyclo heptene rubber; an alkylstyrene rubber; a crosslinked substituted vinyl acrylate copolymer rubber; and diatomaceous earth, and combinations thereof.

In some embodiments, the swellable material may include a copolymer having a water-soluble portion and a water-insoluble portion. By including this dual functionality, it may be possible to control/delay the rate of swelling with particle hydrophobicity. Moreover, the expandable particulates may be stabilized and/or more compatible in either oil, water, or their mixtures thus making the particulate more robust for use in different formations. Examples of the water-soluble portion include, but are not limited to, acrylates, acrylamides, hydroxyalkyl esters, amides, imides, pyrrolidones, and combinations thereof. Examples of the water-insoluble portion include, but are not limited to, acrylonitriles, alkyl acrylates (e.g., where the alkyl has up to 18 carbon atoms), vinyl alkyl ethers, and combinations thereof, among other materials.

In some embodiments, the swellable material may release a gas upon heating or upon contact with water or other chemical reactions causing expansion and swelling when in an appropriate medium. Examples of gas-releasing materials, precursors, or reactions include, but are not limited to: thermal decomposition of diazides; metal reduction of nitrates; metal reduction with chlorates; peroxide reaction with chlorates and perchlorates; decomposition of peroxides to oxygen with or without catalysts such as manganese; carbon reaction with acid; reducing agent reactions; combustion; yeast or aerobic microbe converting sugars; fatty acids or carbohydrates to carbon dioxide; peroxidase reactions with peroxides; reaction of nitrites with amines or ammonia; calcium carbide release of acetylene; and thermal decomposition of ammonium nitrite, magnesium or lithium nitride.

In some embodiments, the swellable material may comprise a swellable clay. Examples of swellable clays include, without limitation: smectite, bentonite, and montmorillonite clays selected from the group consisting of sodium bentonite, sodium montmorillonite, calcium bentonite, calcium montmorillonite, magnesium bentonite, magnesium montmorillonite, iron bentonite, iron montmorillonite, beidellite, nontronite, hectorite, saponite, seiolite, and combinations thereof. In particular embodiments, the swellable clay may be combined with other materials, such as aluminum oxide, or combinations of swellable clays and the organic-swellable materials discussed above.

Embodiments of the expandable particulate may include an exterior coating comprising a resin. The resin in some embodiments may be comprised of small particles which are significantly smaller than the particulate substrate. In some embodiments, the exterior coating may further comprise the expandable material. As previously described, incorporation of the resin into the exterior coating should enhance the strength of the expandable particulate, thus alleviating problems, for example, with the compression of the expandable materials while also potentially allowing the use of lower quality particulate substrates in some embodiments. By way of example, the expandable particulate may be considered relatively incompressible. As used herein, the expandable particulate may be considered relatively incompressible if the expandable particulate compresses by 20% or less upon application of closure pressure in the fracture, and alternatively, by 10% or less. In addition, the exterior coating may also help to alleviate problems that may be associated with proppant diagenesis, which is a reaction of the proppant with the formation face to form deposits that may plug proppant pack porosity.

The amount of the resin used in preparation of the expandable particulate may be in the range of, for example, about 0.1% to about 10% by weight of the particulate substrate and, alternatively, about 3% to about 6% by weight of the particulate substrate. The expandable particulate may be coated with the exterior coating by any suitable method as recognized by one skilled in the art with the benefit of this disclosure. By way of example, the exterior coating may be applied by batch mixing, partial batch mixing, or on-the-fly coating. In some embodiments, the exterior coating can be applied on-the-fly at the well site by injecting or spraying the swellable material to one end of an auger device or sand screw containing the particulate substrate. The rotation or auger action of the auger device helps spread the exterior coating.

In some embodiments, the exterior coating of the resin may be applied and then cured. After curing, the resin should improve the strength of the expandable particulates. The degree of curing may be controlled by the kinetics of the reaction with different compositions. In some embodiments, heat may be the trigger. In particular embodiments, the resin may be pre-cured prior to introduction of the expandable particulates into one or more fractures. In other embodiments, the expandable particulates may be introduced into one or more fractures with an uncured resin. The uncured resin may then cure in the one or more fractures, for example, to consolidate the proppant pack therein. In particular embodiments, the expandable particulates should generally have to be in contact with other proppant grains for good consolidation. By incorporation of the expandable material into the expandable particulate more proppant grains are likely to come into contact with one another, thus enabling more efficient consolidation. This may be particularly advantageous for embodiments where the exterior coating may be applied on-the-fly.

Any appropriate resin may be used in preparation of the expandable particulates. In one embodiment, the resin may comprise a UV-curable resin. The abbreviation "UV" as used herein refers to ultraviolet radiation. Examples of UV-curable resins include, but are not limited to: epoxy resins, urethane acrylate resins, epoxy methacrylate resins, epoxy-modified novolak resins, resole resins, modified resole resins, terpolymers of phenol furfuryl alcohol and formaldehyde, furan resins, urethane resins, melamine resins, and blends and copolymers thereof. Curing of the UV-curable resins may include exposing the UV-curable resin to UV light or an electron beam, wherein a photoinitiator may be added if the resin is to be cured with UV light and a photoinitiator may be optionally added to the resin prior to curing if the resin is to be cured with the electron beam.

In one embodiment, crosslinkers may be used to form such a tight network of polymer that they do not readily undo and form permanent structures. An example crosslinked system of this type may include small particle transition metal crosslinking of an acid-containing polymers. Examples include, without limitation, acrylic, methacrylic, maleic, itaconic, maleic anhydride, styrene-acrylic, vinyl phenol and mixtures thereof; and polymeric esters of vinyl alcohol, including vinyl formate, vinyl acetate, vinyl propionate, vinyl butyrate, and vinyl versitate. Crosslinkers of these and other compounds may include, without limitation, aluminum, tungsten, tin, zirconium, zinc, and combinations thereof, in the compound forms of oxide, hydroxide, carbonate, and acetate, for example. Another suitable example includes Duragreen™ emulsion polymers, available from The Dow Chemical Company, which are self-crosslinking and comprise a styrene-acrylate copolymer. These emulsion polymers may be characterized by having high endurance but also high removability emulsions that are zinc crosslinkable yet have very low ammonia, no odor, and no volatile organic compounds (VOCs). These emulsion polymers may be formulated with 40% polymer, 43% water, and 10-20% surfactants, for example.

In one embodiment, the resin may comprise mixtures of water-soluble and water-insoluble materials. By including water-soluble materials the exterior coating may dissolve to form flow channels (e.g., access paths 18 on FIG. 2) while continuing to retain their hard exterior surface. A specific example of a water-soluble resin includes, for example, a (vinyl alcohol)-(vinylamine) copolymer, which may include a crosslinker having at least two functional groups capable of reacting with amino groups of the copolymer (e.g., a polyamide-epichlorohydrin resin).

In one embodiment, the resin may include a water-curable resin. In certain embodiments, the exterior coating may comprise a water-curable resin and a swellable material. In these embodiments, the exterior coating would harden and expand on the particulate substrate, which would in turn cause cracks to form, which may then form hard interior surfaces when water comes into contact with the water-curable resin. The cracks may be formed by in situ expansion of the swellable material, for example, or alternatively by temperature and mechanical impact, among other mechanisms. The kinetics of both the curing process and the swelling can be controlled by composition or appropriate external triggers. Specific examples of water-curable resins include, without limitation, resins characterized by copolymerizing an unsaturated methylolamide compound with an unsaturated carboxylic acid monoglycol ester in an alcohol polymerization medium.

The expandable particulates disclosed herein may be prepared using any of a variety of different suitable techniques. In some embodiments, a particulate substrate may be coated with an expandable material to form expandable-material coated particulates. The expandable material may be capable of sustaining a resin coating on the exterior. The expandable-material coated particulates may then be coated with a resin to form the expandable particulates. After application of the resin, the resin may be cured to form a hardened, exterior coating on the expandable particulates. In alternative embodiments, the expandable-material coated particulates may be coated with the resin on-the-fly, for example, at the well site for a rapid onset of a hardened, exterior coating. In some embodiments, the resin may cure in one or more fractures, for example, at the same time as swelling of the swellable material occurs.

An example method of preparing an expandable particulate will now be described in accordance with present embodiments. The method may comprise providing a particulate substrate. In some embodiments, the particulate substrate may be plain and uncoated. The method may further comprise providing a swellable material and coating the swellable material onto the particulate substrate to form swellable-material coated particulates. The swellable material may be allowed to at least partially cure on the particulate substrate. In other words, the swellable material may be allowed to dry on the particulate substrate so that it will not adhere to surrounding surfaces. The method may further comprise providing a UV-curable resin and coating the UV-curable resin onto the swellable-material coated particulates to form the expandable particulates. The UV-curable resin may then be cured with a UV-light source while keeping separate the individual expandable particulates. Once cured, the expandable particulates may freely flow without sticking to one another.

In alternative embodiments, an exterior coating comprising an expandable material and a resin may be applied to the particulate substrate to form the expandable particulates. By way of example, a swellable material (e.g., a water-swellable material) may be mixed with a resin (e.g., a water-curable resin) and then applied to a particulate substrate, such as sand. The exterior coating may be exposed to water, causing the exterior coating to harden and expand and thus create cracks (e.g., access paths) in the exterior coating. The cracks may allow water into the interior of the exterior coating, which may then form hard interior surfaces. The kinetics of the curing and swelling may be controlled by material composition and/or appropriate external triggers.

As previously mentioned access paths (e.g., access paths 18 on FIG. 2) may be formed in the exterior coating (e.g., exterior coating 16 on FIG. 2). These access paths may generally allow fluids, such as swell-activating agents, into the interior of the expandable particulates. The access paths may be formed during particulate preparation or after placement of the expandable particulates into the one or more fractures. In some embodiments, the access paths may be created by application of pressure to the exterior coating to crack/break the exterior coating. In one embodiment, the pressure may be applied during particulate preparation. In alternative embodiments, the pressure may be the closure stress applied after placement of the expandable particulates into one or more fractures. In some embodiments, the access paths may be created by application of only a partial exterior coating onto the expandable particulate. For example, an "on-the-fly" coating technique that only partially coats the resin onto the particulate such that at least a portion of the swellable material may be exposed when the expandable particulates are placed into the one or more fractures. In some embodiments, the access paths may be created by dissolution of the exterior coating. By way of example, a water-soluble resin may be included in the exterior coating so that the access paths may be formed upon exposure of the expandable particulates to water. This exposure may occur prior to, or after, placement of the expandable particulates into the one or more fractures.

In some embodiment, the expandable particulates may be included in a treatment fluid. By way of example, the expandable particulates may be included in the treatment fluid in an amount, in the range of about 0.01 pound per gallon (lb/gal) to about 30 lb/gal of the treatment fluid. In other embodiments, the expandable particulates may be included in an amount in the range of about 1 lb/gal to about 10 lb/gal of the treatment fluid.

Any treatment fluid suitable for use in subterranean operations may be used to carry the expandable particulates, including aqueous fluids, non-aqueous fluids, aqueous gels, viscoelastic surfactant gels, foamed gels, and emulsions, for example. Examples of suitable aqueous fluids include fresh water, saltwater, brine, seawater, and/or any other aqueous fluid that does not undesirably interact with the other components used in accordance with present embodiments or with the subterranean formation. Examples of suitable non-aqueous fluids include organic liquids, such as hydrocarbons (e.g., kerosene, xylene, toluene, or diesel), oils (e.g., mineral oils or synthetic oils), esters, and the like. Suitable aqueous gels are generally comprised of an aqueous fluid and one or more gelling agents. Suitable emulsions may be comprised of two immiscible liquids such as an aqueous liquid or gelled liquid and a hydrocarbon. Foams may be created by the addition of a gas, such as carbon dioxide or nitrogen. In certain embodiments, the treatment fluids are aqueous gels comprised of an aqueous fluid, a gelling agent for gelling the aqueous fluid and increasing its viscosity, and, optionally, a crosslinking agent for crosslinking the gel and further increasing the viscosity of the fluid. The increased viscosity of the gelled, or gelled and cross-linked, treatment fluid, inter alia, reduces fluid loss and allows the treatment fluid to transport significant quantities of suspended particulates. The density of the treatment fluid can be increased to provide additional particle transport and suspension in some embodiments.

In some embodiments, the treatment fluid may comprise one or more friction reducers, such as polymers, added to water to produce what is known in the art as "slick-water." In certain embodiments, the friction reducing polymer may be a synthetic polymer. Additionally, for example, the friction reducing polymer may be an anionic polymer or a cationic polymer, in accordance with certain embodiments. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof.

Suitable friction reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the treatment fluid. Indeed, as used herein, the term "polymer" in the context of a friction reducing polymer, is intended to refer to the acid form of the friction reducing polymer, as well as its various salts.

The friction reducing polymer may be included in the treatment fluids, for example, in an amount equal to or less than 0.2% by weight of the aqueous fluid present in the treatment fluid. In some embodiments, the friction reducing polymers may be included in embodiments of the treatment fluids in an amount sufficient to reduce friction without gel formation upon mixing. By way of example, the treatment fluid comprising the friction reducing polymer may not exhibit an apparent yield point. While the addition of a friction reducing polymer may minimally increase the viscosity of the treatment fluids, the polymers are generally not included in the treatment fluids in an amount sufficient to substantially increase the viscosity. For example, velocity rather than fluid viscosity generally may be relied on for particulate transport. In some embodiments, the friction reducing polymer may be present in an amount in the range of from about 0.01% to about 0.15% by weight of the aqueous fluid. In some embodiments, the friction reducing polymer may be present in an amount in the range of from about 0.025% to about 0.1% by weight of the aqueous fluid.

In certain embodiments, additional non-swellable proppant may also be included in the treatment fluid. The additional proppant may include, for example, any of a variety of materials suitable for use in subterranean operations. Suitable materials for use as proppant include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials may include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The additional proppant may be included in the treatment fluid in an amount, in the range of about 0.01 lb/gal to about 30 lb/gal of the treatment fluid. In other embodiments, the additional proppant may be included in an amount in the range of about 1 lb/gal to about 10 lb/gal of the treatment fluid. In some embodiments, the additional non-swellable proppant may be micron-sized proppant having a mean particle size of from about 0.5 µm to about 150 µm. For example, the size of the micron-sized proppant may be about 0.5 µm to about 10 µm, 100 µm, 150 µm, etc.

In accordance with present embodiments, methods are provided for treating at least a portion of a subterranean formation. The methods may include introducing a treatment fluid comprising expandable particulates into the subterranean formation; and depositing at least a portion of the expandable particulates in the subterranean formation. For example, at least about 10% of the expandable particulates may be deposited in the subterranean formation and alternative, 95% or more of the expandable particulates may be deposited in the subterranean formation. In some embodiments, the expandable particulates may be deposited in one or more fractures in the subterranean formation.

An embodiment provides a method of treating a subterranean formation comprising: introducing a treatment fluid comprising expandable particulates into the subterranean formation, wherein the expandable particulates each comprise a particulate substrate, a swellable material coating the particulate substrate, and an exterior coating comprising a resin; and depositing at least a portion of the expandable particulates in the subterranean formation.

An embodiment provides a method of preparing an expandable particulate comprising: coating a particulate substrate with an expandable material to form an expandable-material coated particulate; and coating the expandable-material coated particulate with a resin to form the expandable particulate.

An embodiment provides a well treatment fluid comprising: a treatment fluid comprising expandable particulates, wherein the expandable particulates each comprise a particulate substrate, a swellable material coating the particulate substrate, and an exterior coating comprising a resin.

In particular embodiments, the expandable particulates may be placed into one or fractures in a fracturing operation. By way of example, the expandable particulates either alone or in combination with additional proppant may be used to prop open the one or more fractures after release of pressure. In some embodiments, a method of fracturing a subterranean formation may comprise providing a treatment fluid comprising expandable particulates; and placing the treatment fluid into the subterranean formation at a pressure sufficient to create or enhance one or more fractures in the subterranean formation. The treatment fluid may be introduced into the subterranean formation such that a proppant pack comprising the expandable particulates is formed in the one or more fractures. After placement in the one or more fractures, contact with a swell-activating agent may cause the swellable material to swell such that the expandable particulates are in a substantially expanded configuration. A "substantially expanded configuration" means that the expandable particulate has expanded to at least 50% in size from its unexpanded configuration.

The embodiments described herein may be used in any subterranean formation capable of being fractured. Formations where the present methods may be most advantageous include, but are not limited to, formations with at least a portion of the formation characterized by very low permeability; very low formation pore throat size; high closure pressures; high brittleness index; and any combination thereof.

In some embodiments, at least a portion of a subterranean formation may have a permeability ranging from a lower limit of about 0.1 nano Darcy (nD), 1 nD, 10 nD, 25 nD, 50 nD, 100 nD, or 500 nD to an upper limit of about 10 mD, 1 mD, 500 microD, 100 microD, 10 microD, or 500 nD, and wherein the permeability may range from any lower limit to any upper limit and encompass any subset there between.

In some embodiments, at least a portion of a subterranean formation may have an average formation pore throat size ranging from a lower limit of about 0.005 microns, 0.01 microns, 0.05 microns, 0.1 microns, 0.25 microns, or 0.5 microns to an upper limit of about 2.0 microns, 1.5 microns, 1.0 microns, or 0.5 microns, and wherein the average formation pore throat size may range from any lower limit to any upper limit and encompass any subset there between.

In some embodiments, at least a portion of a subterranean formation may have a closure pressure greater than about 500 psi to an unlimited upper limit. While the closure pressure upper limit is believed to be unlimited, formations where the example methods may be applicable include formations with a closure pressure ranging from a lower limit of about 500 psi, 1000 psi, 1500 psi, or 2500 psi to an upper limit of about 20,000 psi, 15,000 psi, 10,000 psi, 8500 psi, or 5000 psi, and wherein the closure pressure may range from any lower limit to any upper limit and encompass any subset there between.

In some embodiments, at least a portion of a subterranean formation may have a brittleness index ranging from a lower limit of about 5, 10, 20, 30, 40, or 50 to an upper limit of about 150, 125, 100, or 75, and wherein the brittleness index may range from any lower limit to any upper limit and encompass any subset therebetween. Brittleness is a composite of Poisson's ratio and Young's modulus.

Figure 4:
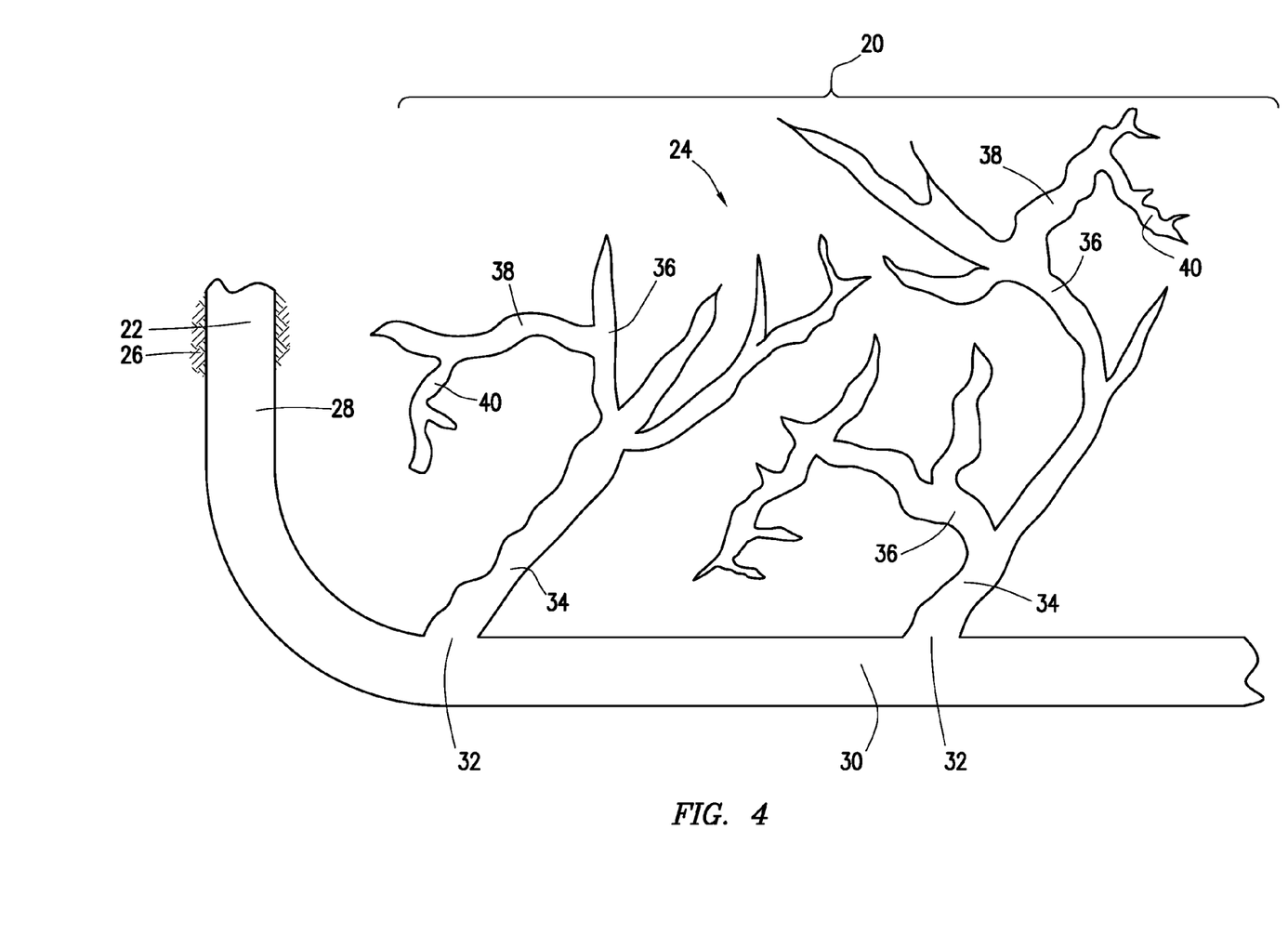
FIG. 4 illustrates an example schematic of a typical fracture network.

FIG. 4 illustrates a non-limiting example of a typical complex fracture network 20 extending from a well bore 22 into a targeted subterranean formation 24. In some embodiments, the expandable particulates may be introduced into the complex fracture network 20. As illustrated, well bore 22 penetrates both non-targeted subterranean formation 26 and the targeted subterranean formation 24. In the illustrated embodiments, well bore 22 comprises a vertical well bore portion 28 and a horizontal well bore portion 30. In accordance with the present embodiments, the complex fracture network 20 may be formed by fracturing the targeted subterranean formation 24 via access conduits 32. As illustrated, the complex fracture network 20 may comprise primary fractures 34 which may branch into a variety of fracture branches that communicate with the primary fracture, including secondary fracture branches 36, tertiary fracture branches 38, quaternary fracture branches 40, and the like. As discussed above, the complex fracture network 20 comprises the primary fracture 34, all secondary fracture branches 36, all tertiary fracture branches 38, and all quaternary fracture branches 40; regardless of size. The secondary fracture branches 36, tertiary fracture branches 38, and/or quaternary fracture branches 40 or portions thereof may be micro-fractures, thus limiting the size of particulates that can be deposited therein. It should be understood that the methods provided herein are applicable to well bores at any angle including, but not limited to, vertical wells, deviated wells, highly deviated wells, horizontal wells, and hybrid wells comprising sections of any combination of the aforementioned wells. In some embodiments, a subterranean formation and well bore may be provided with an existing fracture network.

In certain embodiments, all or part of a well bore penetrating the subterranean formation may include casing pipes or strings placed in the well bore (a "cased hole" or a "partially cased hole"), among other purposes, to facilitate production of fluids out of the formation and through the well bore to the surface. In other embodiments, the well bore may be an "open hole" that has no casing.

In various embodiments, systems configured for delivering the treatment fluids described herein to a downhole location are described. In various embodiments, the systems can comprise a pump fluidly coupled to a tubular, the tubular containing a treatment fluid comprising the expandable particulates.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment fluid before it reaches the high pressure pump.

In some embodiments, the systems described herein can further comprise a mixing tank that is upstream of the pump and in which the treatment fluid is formulated. In various embodiments, the pump (e.g., a low pressure pump, a high pressure pump, or a combination thereof) may convey the treatment fluid from the mixing tank or other source of the treatment fluid to the tubular. In other embodiments, however, the treatment fluid can be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluid may be drawn into the pump, elevated to an appropriate pressure, and then introduced into the tubular for delivery downhole.

Figure 5:
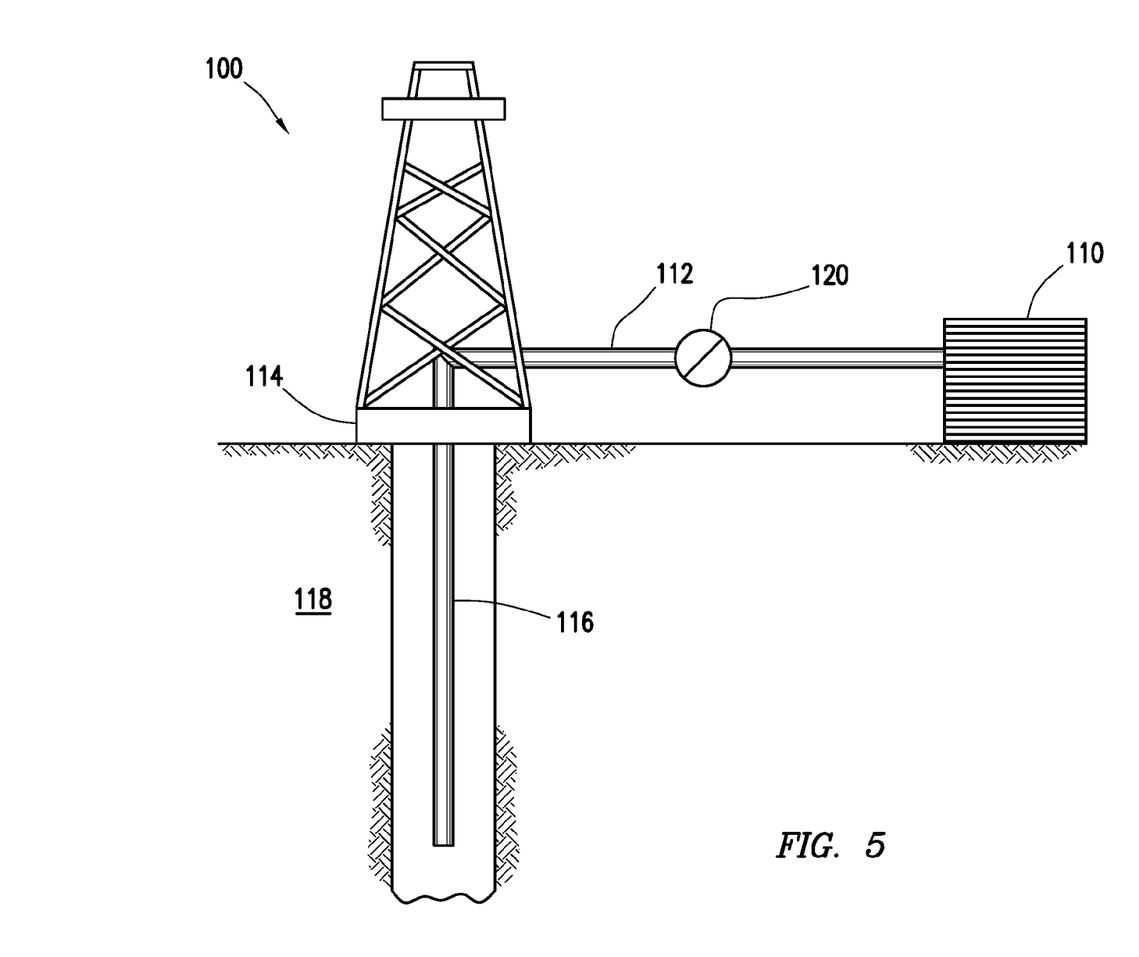
FIG. 5 illustrates an example schematic of a system for using the disclosed fracturing methods.

FIG. 5 shows an illustrative schematic of a system that can deliver example treatment fluids to a downhole location, according to one or more embodiments. It should be noted that while FIG. 5 generally depicts a land-based system, it is to be recognized that like systems may be operated in subsea locations as well. As depicted in FIG. 5, system 100 may include mixing tank 110, in which an example treatment fluid may be formulated. The treatment fluid may be conveyed via line 112 to wellhead 114, where the treatment fluid enters tubular 116, tubular 116 extending from wellhead 114 into subterranean formation 118. Upon being ejected from tubular 116, the treatment fluid may subsequently penetrate into subterranean formation 118. Pump 120 may be configured to raise the pressure of the treatment fluid to a desired degree before its introduction into tubular 116. It is to be recognized that system 100 is merely exemplary in nature and various additional components may be present that have not necessarily been depicted in FIG. 5 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 5, the treatment fluid may, in some embodiments, flow back to wellhead 114 and exit subterranean formation 118. In some embodiments, the treatment fluid that has flowed back to wellhead 114 may subsequently be recovered and recirculated to subterranean formation 118.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the example embodiments are well adapted to attain the ends and advantages mentioned as well as those that are inherent therein. The particular embodiments disclosed above are illustrative only, as the disclosed embodiments may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of treating a subterranean formation comprising:
    introducing a treatment fluid comprising expandable particulates into a wellbore penetrating a subterranean formation, wherein the expandable particulates each comprise a particulate substrate, a swellable material coating the particulate substrate, and an exterior coating comprising a cured resin, wherein the exterior coating comprises one or more access paths to allow fluid entry to the swellable material beneath the resin;
    depositing at least a portion of the expandable particulates in the subterranean formation such that a proppant pack comprising the portion of the expandable particulates is formed in one or more fractures in the subterranean formation, wherein the one or more access paths being formed after the expandable particulates are deposited in the subterranean formation; and
    allowing a fluid to enter the one or more access parts and contact the swellable material.

2. The method of claim 1, wherein the portion of the expandable particulates is deposited in one or more microfractures in a complex fracture network formed in the subterranean formation.

3. The method of claim 1, further comprising contacting the exterior coating of at least one of the expandable particulates with water to form the one or more access paths through the exterior coating.

4. The method of claim 1, further comprising applying pressure to the exterior coating of at least one of the expandable particulates to form the one or more access paths through the exterior coating.

5. The method of claim 1, wherein the expandable particulates are present in the treatment fluid in an amount in the range of about 0.1 pounds to about 30 pounds per gallon of the treatment fluid, and wherein the particulate substrate comprises at least one material selected from the group consisting of sand, bauxite, a ceramic material, a glass material, a polymer material, a tetrafluoroethylene material, a nut shell, a ground or crushed nut shell, a seed shell, a ground or crushed seed shell, a fruit pit piece, a ground or crushed fruit pit, processed wood, a composite particulate, and any combination thereof.

6. The method of claim 1, wherein the particulate substrate has a d50 of less than about 150 microns.

7. The method of claim 1, wherein the swellable material comprises at least one water swellable material selected from the group consisting of a cross-linked polyacrylamide, a cross-linked polyacrylate, a cross-linked polymer of acrylamide and acrylate monomers, a starch grafted with acrylonitrile and acrylate, a cross-linked polymer of two or more monomers selected from the group consisting of allylsulfonate, 2-acrylamido-2-methyl-1-propanesulfonic acid, 3-allyloxy-2-hydroxy-1-propanesulfonic acid, acrylamide, and acrylic acid monomer, a salt of carboxyl starch, a salt of carboxylmethyl starch, a salt of carboxymethyl cellulose, a salt of cross-linked carboxyalkyl polysaccharide, a starch grafted with acrylonitrile and acrylate monomers, a swellable clay, and any combination thereof.

8. The method of claim 1, wherein the swellable material comprises at least one oil-swellable material selected from the group consisting of a polyacrylate rubber, an isoprene rubber, a chloroprene rubber, a butyl rubber, a brominated butyl rubber, a chlorinated butyl rubber, a neoprene rubber, a styrene-butadiene copolymer rubber, a sulphonated polyethylene rubber, an ethylene-acrylate rubber, an epichlorohydrin ethylene oxide copolymer rubber, an ethylene-propylene rubber, an ethylene-propylene-diene terpolymer rubber, an ethylene vinyl acetate copolymer rubber, a fluoro rubber, a fluoro silicone rubber, a silicone rubber, a poly 2,2,1-bicyclo heptene rubber, an alkylstyrene rubber, a crosslinked substituted vinyl acrylate copolymer rubber, diatomaceous earth, and any combination thereof.

9. The method of claim 1, wherein the resin comprises at least one UV-curable resin selected from the group consisting of an epoxy resin, a urethane acrylate resin, an epoxy methacrylate resin, an epoxy-modified novolak resin, a resole resin, a modified resole resin, a terpolymer of phenol furfuryl alcohol and formaldehyde, a furan resin, a urethane resin, a melamine resin, and blends and copolymers thereof.

10. The method of claim 1, wherein the resin comprises a mixture of a water-soluble material and a water-insoluble material.

11. The method of claim 1, wherein the resin comprises a water-curable resin.

12. The method of claim 1, wherein the treatment fluid is introduced through a tubular and into the subterranean formation at a pressure of 1000 psi or greater using at least a high pressure pump.

13. The method of claim 1, wherein the treatment fluid further comprises a micron-sized, non-swellable proppant having mean particle size of about 0.5 µm to about 150 µm.

* * * * *